United States Patent [19]

Yang

[11] Patent Number: 5,192,831

[45] Date of Patent: * Mar. 9, 1993

[54] STRUCTURE OF FLOOR JUNCTION BOX

[76] Inventor: Chin-Hui Yang, 4F., No. 2, Lane 409, Chung Cheng Road, Hsin Tien City, Taipei Hsien, Taiwan

[*] Notice: The portion of the term of this patent subsequent to Mar. 31, 2009 has been disclaimed.

[21] Appl. No.: 647,885

[22] Filed: Jan. 30, 1991

[51] Int. Cl.$^5$ .............................................. H02G 3/28
[52] U.S. Cl. ...................................................... 174/48
[58] Field of Search ........................ 174/48, 49; 52/221

[56] References Cited

U.S. PATENT DOCUMENTS

| 2,930,504 | 3/1960 | Hudson | 174/48 X |
| 4,931,597 | 6/1990 | Kimbrough et al. | 174/48 |
| 5,101,078 | 3/1992 | Yang | 174/48 |

Primary Examiner—Leo P. Picard
Assistant Examiner—David A. Tone
Attorney, Agent, or Firm—Varndell Legal Group

[57] ABSTRACT

A floor junction box having a plurality of columns releasably set between the base and the cover plate thereof for controlling the size of the wiring holes therebetween so that conductors of different size and shape can be alternatively fastened therein for connecting a variety of wire conduits. Insert is provided to seal each wiring hole when no electric wire is to be inserted therein.

1 Claim, 3 Drawing Sheets

STRUCTURE OF FLOOR JUNCTION BOX

BACKGROUND OF THE INVENTION

The present invention is related to a structure of floor junction box for distributing electric wires and more particularly to such a floor junction box which is inexpensive to manufacture and suitable for connecting a variety of wire conduits of different size and shape.

The known structure of floor junction box is integrally made in a solid piece. This structure of floor junction box is expensive because it requires higher skill and much time to manufacture. In this structure, the wiring holes which are provided for fastening wire conduit can not be changed. Therefore, when different size or shape of wire conduit is used, different size and shape of wiring holes must be respectively made.

SUMMARY OF THE INVENTION

The present invention has been accomplished to eliminate the aforesaid problems. It is therefore an object of the present invention to provide a floor junction box which is inexpensive to manufacture.

It is another object of the present invention to provide a floor junction box which is easy to assemble and convenient to install.

It is still another object of the present invention to provide a floor junction box which can be conveniently adjusted for mounting a variety of wire conduits.

It is still another object of the present invention to provide a floor junction box which has means to seal out dust and moisture when it is not in use.

DETAILED DESCRIPTION OF THE PREFERRED EMBODIMENTS

Figure 1:
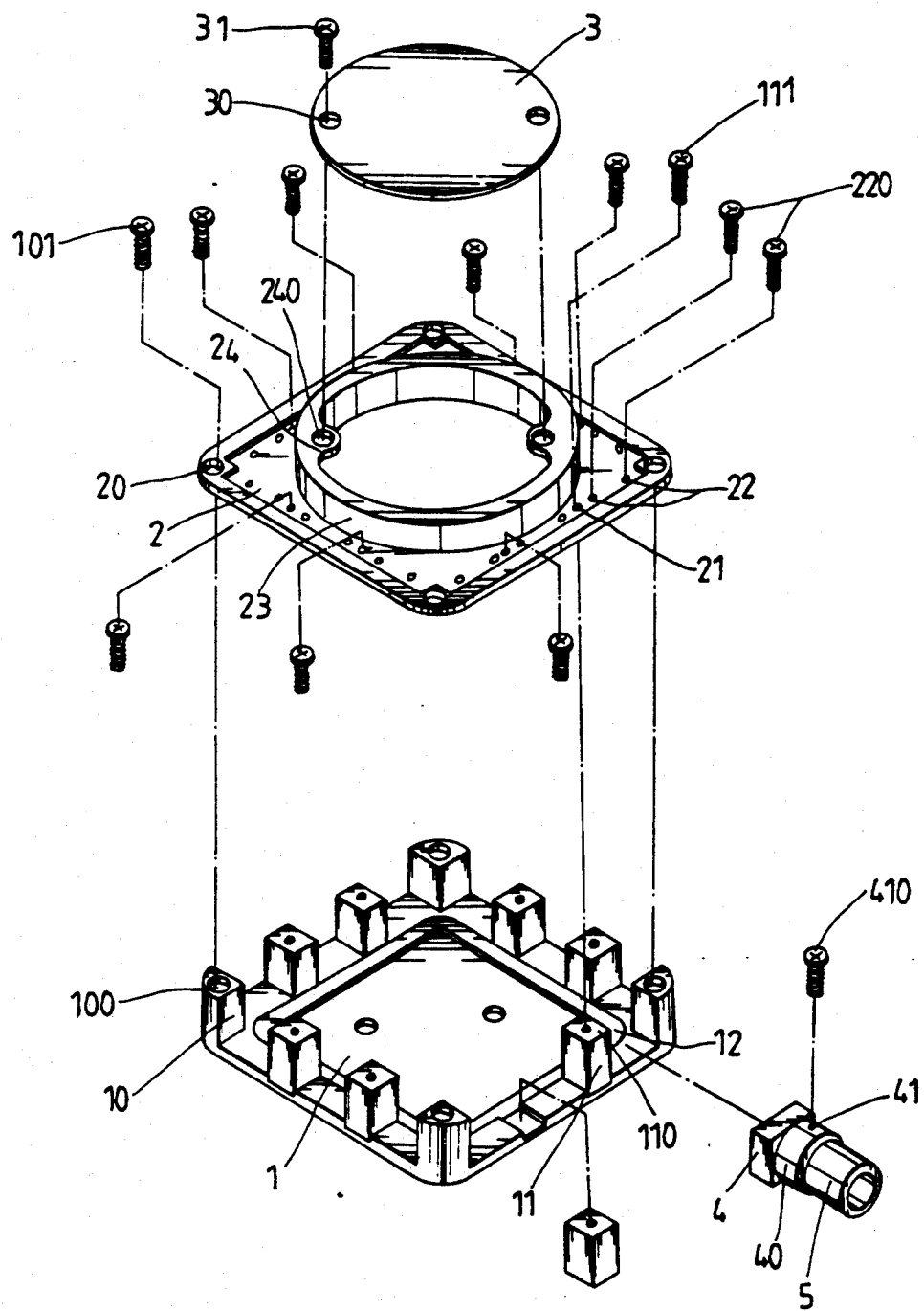
FIG. 1 is a perspective dismantled view of the preferred embodiment of the floor junction box of the present invention.
Figure 3:
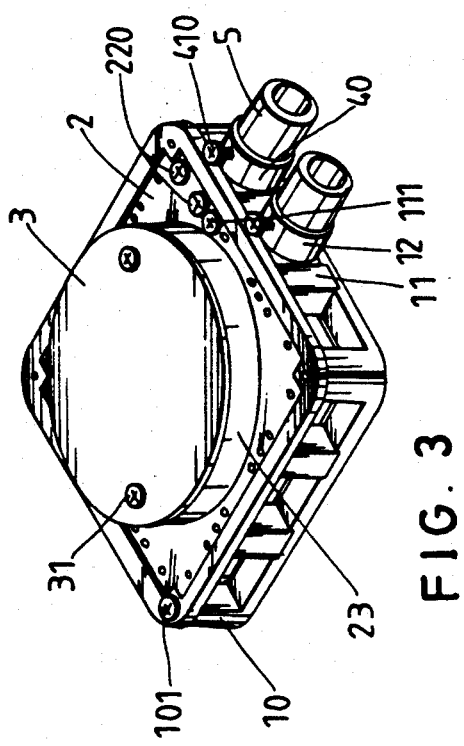
FIG. 3 illustrates an application of the present invention in which the connectors are provided for connecting circular wire conduit.
Figure 4:
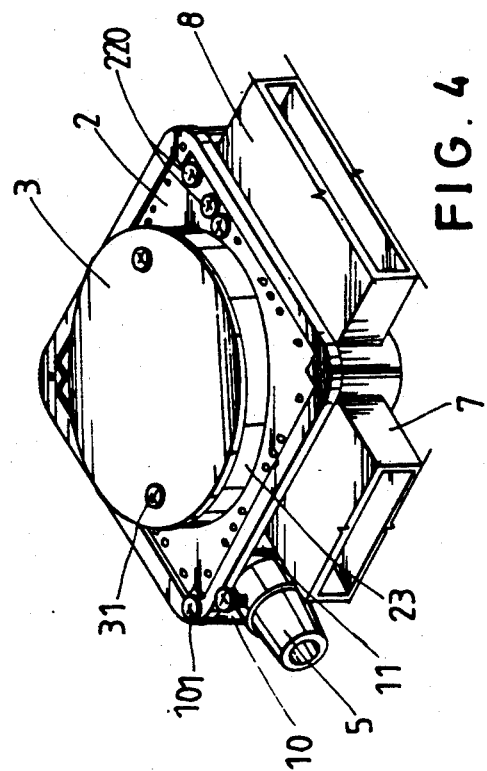
FIG. 4 illustrates another application of the present invention in which two different designs of connectors are respectively provided for connecting circular and rectangular wire conduits.
Figure 2:
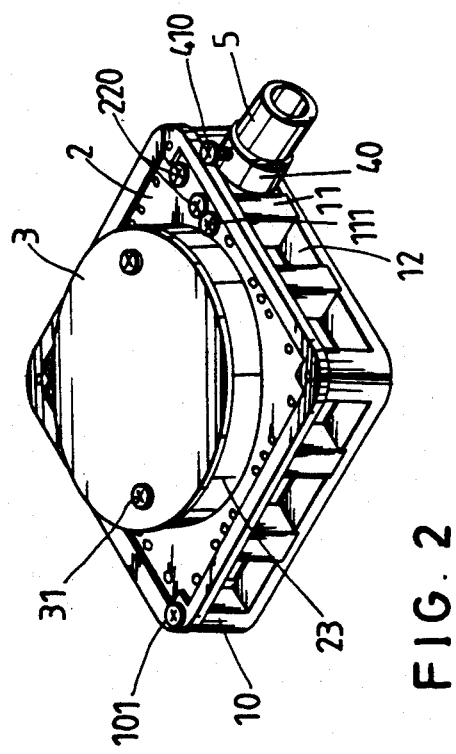
FIG. 2 is a perspective assembly view thereof.

Referring to FIGS. 1 and 2, a floor junction box in accordance with the present invention is generally comprised of a base 1, a cover plate 2, a top cap 3 and a plurality of connectors 4. The base 1 has four pieces of sector columns 10 at the four corners thereof and a plurality of recesses 1100 around the four sides thereof between said sector columns 10 for mounting a square column 11 each. The pitch 12 between the columns 10 and 11 is provided for mounting the connectors 4. By selectively removing the square columns 11 from the recesses 1100, the pitch 12 between each two of the columns 10 and 11 is changed so that insert 6 or different size of rectangular tube 7, 8 or 9 can be fastened therein (see FIGS. 2, 3, 4, 6, 7 and 8). Further, the sector and square columns 10 and 11 have each a bolt hole 100 or 110 at the top for fastening the cover plate 2. The cover plate 2 is made in shape and size matching with the base 1, having four circular holes 20 at the four corners thereof corresponding to the bolt holes 100 of the sector columns 10 and a plurality of round holes 21 around the four sides thereof corresponding to the bolt holes 110 of the square columns 11. Therefore, screws 101 and 111 can be respectively fastened through the circular holes 20 and the round holes 21 to secure the cover plate 2 to the base 1 at the top. There are two bolt holes 22 each respectively made at either side of each round hole 21 and disposed right above the pitch 12. When a connector 4 is inserted in each pitch 12, two screws 220 are fastened in the two bolt holes 22 that are aligned above to firmly secure said connector 4 in position. The cover plate 2 further has a circular flange 23 at the center defining therein an opening, which circular flange 23 has two symmetrical lugs 24 transversely projecting inwards with a bolt hole 240 each defined therein. The top cap 3 which is made to cover the circular flange 23 of the cover plate 2 has two round holes 30 at two opposite locations corresponding to the two bolt holes 240 of the two symmetrical lugs 24 through which screws 31 are fastened to secure the top cap 3 to the cover plate 2.

Figure 5:
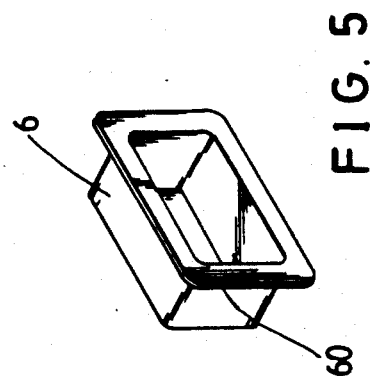
FIG. 5 illustrates the structure of the insert.
Figure 6:
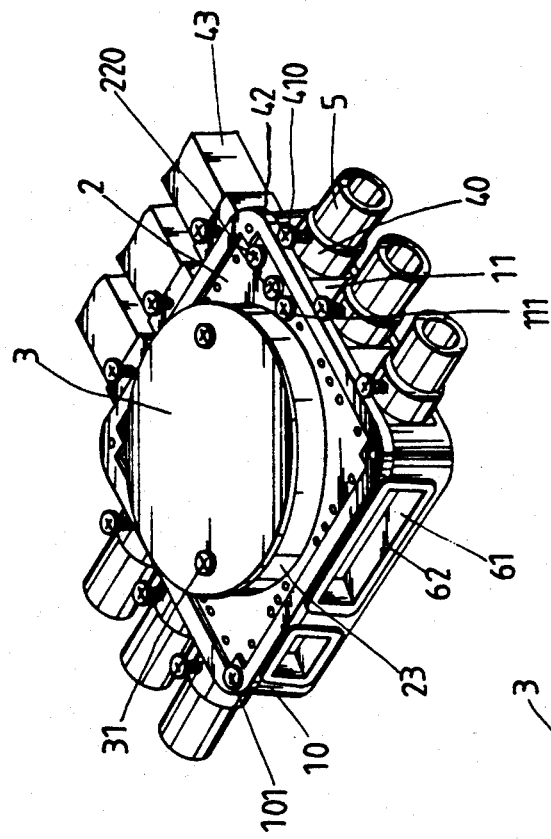
FIGS. 6, 7 and 8 illustrate various installation examples of the present invention.
Figure 7:
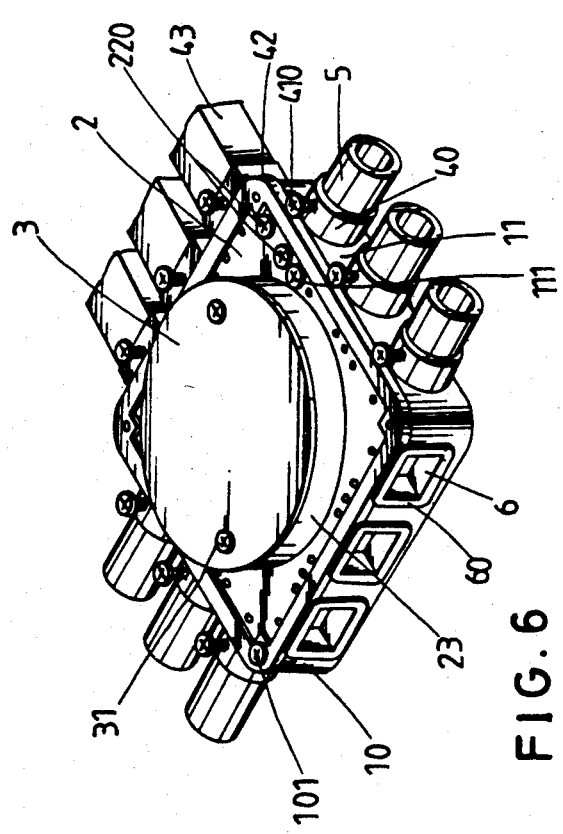
Figure 8:
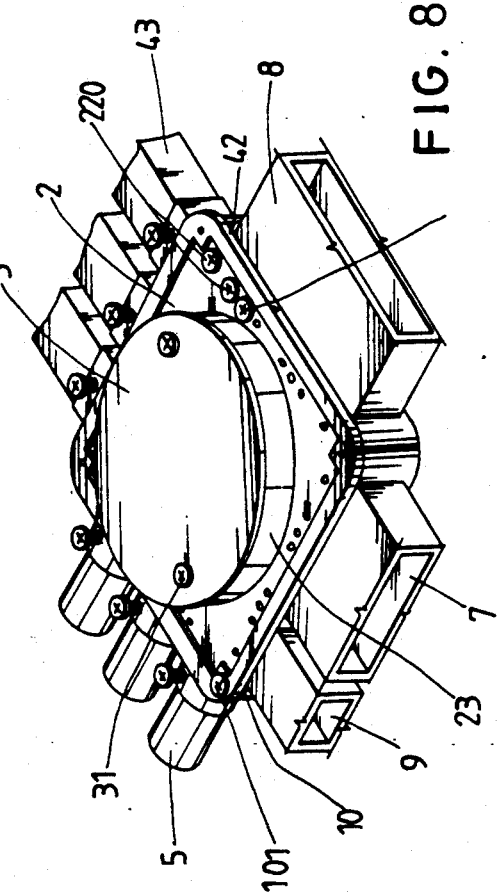

Referring to FIGS. 1 and 2 again, screws 220 can be respectively fastened in the bolt holes 22 to secure a connector 4 in each pitch 12. When the pitch 12 is not in use, the connector 4 can be removed by loosening the screws 220 and then, an insert 6 or 61 can be inserted therein and retained in position by screwing tight the screws 220 again so as to block up the pitch 12 (see FIGS. 5, 6 and 7). The insert 6 or 61 has each a flange 60 or 62 at one side. When it is inserted in the pitch 12, the flange 60 or 62 is stopped at the outside around the pitch 12 to completely seal the gap.

Referring to FIG. 1 again, the connector 4 has a tubular connecting end 40 having a bolt hole 41 at the top for fastening a screw 410 to secure a wire conduit 5 in said tubular connecting end 40. In an alternate form of the present invention, the connecting end of the connector is a rectangular tube 42 for mounting a rectangular wire conduit 42 (see FIGS. 6, 7 and 8).

Because the base, the cover plate 2 and the top cap 3 are separately made, the present invention is more easy to manufacture. Therefore, manufacturing cost of the present invention can be greatly reduced.

I claim:

1. A floor junction box, comprising:

a square base having sector columns at the four corners thereof, a plurality of recesses around the four sides thereof between said sector columns, a plurality of square columns respectively releasably fastened in said recesses defining with said sector columns a plurality of wiring holes therebetween;

a square cover plate secured to said sector and square columns by screw means at the top, having bolt holes around the four sides thereof respectively disposed above said wiring holes, a circular flange at the center defining therein an opening;

a top cap secured to said circular flange by screw means to cover over said opening;

a plurality of connectors fastened in said wiring holes and respectively secured in position by screw means fastened in said bolt holes on said square cover, having each a tubular connecting end for fastening a wire conduit, said tubular connecting end having a bolt hole through which screw means can be fastened to secure said wire conduit in position; and wherein a plurality of inserts can be used to block up said wiring holes when said connectors are removed therefrom, said inserts having each a flange at one side which is stopped at the outside of said wiring holes to completely seal the gap when inserted.

* * * * *